UNITED STATES PATENT OFFICE.

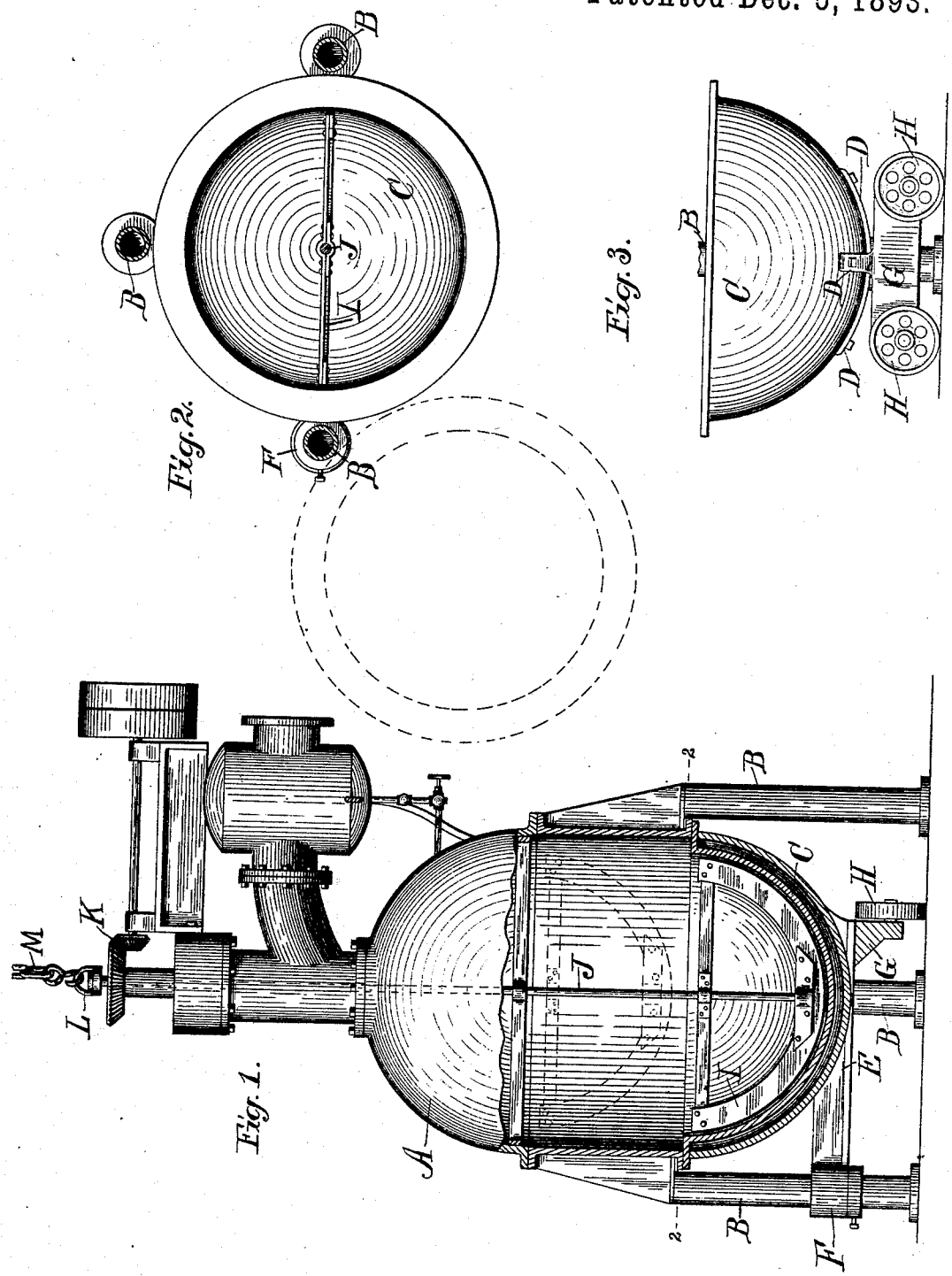

BARTON E. SPERRY, OF BATAVIA, ILLINOIS.

VACUUM-PAN.

SPECIFICATION forming part of Letters Patent No. 509,962, dated December 5, 1893.

Application filed December 13, 1892. Serial No. 455,046. (No model.)

*To all whom it may concern:*

Be it known that I, BARTON E. SPERRY, a citizen of the United States, residing at Batavia, in the county of Kane and State of Illinois, have invented a certain new and useful Improvement in Vacuum-Pans, which is fully set forth in the following specification, reference being had to the accompanying drawings, in which—

Figure 1 represents a side elevation, with a portion cut in section. Fig. 2, represents a transverse view, taken at the line 2—2, Fig. 1. Fig. 3, is a side elevation of the lower portion of the vacuum pan.

My invention consists in the mechanism hereinafter described and made the subject matter of the claims, which operates to admit of the lower part of the receptacle being swung around on its pivot to make it accessible for filling and emptying, and also consists in the combination with such pivoted portion of the receptacle, of an adjustable stirrer for stirring the contents of the receptacle, all as hereinafter specified.

In the accompanying drawings, A represents the upper portion of my receptacle, supported upon legs, B—B, which are screwed, or otherwise fastened, to the floor.

C, is the lower section of the vacuum pan, which is firmly secured to brackets D, supported by the pivoted arm, E, which is pivoted at F to one of the legs B. One end of this pivoted arm E rests upon a cross-piece G which is supported on the casters H that rest on the floor. This lower section of the vacuum pan C can be swung around on the pivot, F, from beneath the upper portion A of the receptacle by the wheels H rolling on the floor, when it can be emptied of its contents and refilled and readily swung back into position.

It is desirable always to have a stirrer, I, to stir the contents of the vacuum pan when the cooking process is going on. This stirrer consists of the vertical shaft, J, with suitable bearings in the upper portion of the receptacle, and is revolved by the beveled gear-wheels, K. The top of this shaft is provided with a link, L, into which the hook of the chain, M, can be hooked for raising the stirrer or agitator vertically out of the vacuum pan C, so that the lower section can be swung out into the position shown in dotted lines in Fig. 2, to be emptied and filled, as above described. The other portions of this receptacle are made in any well-known manner, although I have shown it made in parts and bolted together to make it air-tight. The joint between the lower section of the vacuum pan C and upper portion A, I preferably provide with a rubber gasket, in any of the well-known ways, and the atmospheric pressure seals it as soon as the exhaust commences.

It will be readily seen that the operation of my vacuum pan is very simple, as the stirrer or agitator can be readily raised and the lower section of the pan swung around on the caster-wheels, the arm E on which it rests turning on the pivot F, and be as readily swung back into position when it is refilled. The stirrer or agitator I being made vertically adjustable, as shown and described, the operation of swinging the vacuum pan around is not interfered with.

Having thus fully described the construction and operation of my invention, what I claim, and desire to secure by Letters Patent, is—

1. In a vacuum pan the combination of the lower section of the vacuum pan C; the upper portion of the receptacle A; a pivoted arm supporting the lower section of the vacuum pan and adapted to swing around, carrying the lower section of the vacuum pan with it, substantially as and for the purpose specified.

2. In a vacuum pan, the combination of the lower section of the pan; the pivoted arm supporting said section of the vacuum pan; the upper portion of the receptacle; and a vertical adjustable agitator or stirrer which can be raised and lowered in bearings in the upper portion of the receptacle to admit of the lower section of the vacuum pan being swung around, as specified.

BARTON E. SPERRY.

Witnesses:
ALOYSIA HELMICH,
R. C. PAGE.